US012803870B2

(12) United States Patent
Sukhale

(10) Patent No.: US 12,803,870 B2
(45) Date of Patent: Nov. 17, 2026

(54) SYSTEM AND METHOD FOR AUTOMATED CONFIGURATION OF NODES IN A SERVER CLUSTER

(71) Applicant: Rakuten Symphony, Inc., Tokyo (JP)

(72) Inventor: Sudhir Sukhale, Bengaluru (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 758 days.

(21) Appl. No.: 17/911,594

(22) PCT Filed: Jul. 15, 2022

(86) PCT No.: PCT/US2022/037254
§ 371 (c)(1),
(2) Date: Jan. 18, 2024

(87) PCT Pub. No.: WO2024/015070
PCT Pub. Date: Jan. 18, 2024

(65) Prior Publication Data
US 2024/0214265 A1 Jun. 27, 2024

(51) Int. Cl.
*H04L 12/66* (2006.01)
*H04L 41/08* (2022.01)
*H04L 41/0806* (2022.01)
*H04L 41/0869* (2022.01)

(52) U.S. Cl.
CPC ...... *H04L 41/0806* (2013.01); *H04L 41/0869* (2013.01); *H04L 41/0886* (2013.01)

(58) Field of Classification Search
CPC ............. H04L 41/0806; H04L 41/0869; H04L 41/0886; H04L 12/66
See application file for complete search history.

(56) References Cited

U.S. PATENT DOCUMENTS 7,565,517 B1 * 7/2009 Arbon ........................ G06F 8/64 713/1
9,288,117 B1 * 3/2016 Angrish ................ G06F 15/177
9,495,188 B1 * 11/2016 Ettema ................ H04L 63/0245
9,926,131 B1 * 3/2018 Lehmann ............. G06Q 10/083
(Continued)

OTHER PUBLICATIONS

International Search Report dated Nov. 16, 2022 from the International Searching Authority in International Application No. PCT/US2022/037254.
(Continued)

*Primary Examiner* — Nicholas P Celani
*Assistant Examiner* — Wuji Chen
(74) *Attorney, Agent, or Firm* — Sughrue Mion, PLLC

(57) ABSTRACT

In order to provide automated configuration of a first computing device intended for deployment and installation as a node of a selected role in a server cluster, a processor acquires a hardware description of the first computing device internally stored by the first computing device. Following validation of the hardware description according to hardware of a second computing device previously configured as a node of the selected role in the server cluster, the processor configures the first computing device by installing an operating system image of the second computing device to the first computing device. The processor then registers the first computing device in the server cluster as a node having the selected role.

17 Claims, 4 Drawing Sheets

(56) References Cited

U.S. PATENT DOCUMENTS 10,509,648 B2 * 12/2019 Rabin ........ G06F 8/77
10,552,176 B1 * 2/2020 Putney ........ G06F 8/71
10,621,019 B1 * 4/2020 Faulhaber, Jr. ...... G06F 9/45558
10,785,334 B2 * 9/2020 Kristiansson ....... G06F 16/2255
10,812,366 B1 * 10/2020 Berenberg .......... H04L 67/1014
10,931,786 B1 * 2/2021 Vasquez .............. H04L 41/0806
10,986,174 B1 * 4/2021 Sharma ............... H04L 12/4641
11,055,273 B1 * 7/2021 Meduri ............... G06F 16/2358
11,151,467 B1 * 10/2021 Shtein ........ G06N 7/00
11,200,204 B2 * 12/2021 Wang ........ G06F 16/128
11,272,164 B1 * 3/2022 Xing ........ G06F 9/445
11,341,605 B1 * 5/2022 Singh ........ H04L 67/1095
11,429,893 B1 * 8/2022 Tong ........ G06N 20/00
11,487,942 B1 * 11/2022 Senthivel .............. G06F 40/295
11,537,439 B1 * 12/2022 Liberty ........ G06F 9/5077
11,550,614 B2 * 1/2023 Faulhaber, Jr. ..... G06F 9/45558
11,652,769 B2 * 5/2023 Weiss ........ H04L 51/214 709/206
11,757,712 B1 * 9/2023 Thanabalan ........ H04L 41/0806 709/222
11,775,867 B1 * 10/2023 Jamei ........ H04L 63/10 706/12
11,853,401 B1 * 12/2023 Nookula ............. G06F 18/2163
2002/0156877 A1 * 10/2002 Lu ........ G06F 8/63 709/221
2003/0023839 A1 * 1/2003 Burkhardt ........ G06F 8/63 713/1
2004/0088142 A1 * 5/2004 Ashley ........ H04L 41/06 702/184
2004/0205349 A1 * 10/2004 Vaha-Sipila ............ G06F 21/53 713/182
2005/0125407 A1 * 6/2005 Kraus ........ G06F 21/575
2006/0037016 A1 2/2006 Saha et al.
2006/0195839 A1 * 8/2006 Lin ........ G06F 11/3698 717/174
2007/0168498 A1 7/2007 Lambert et al.
2008/0183837 A1 * 7/2008 Lee ........ G06F 8/63 709/212
2009/0043890 A1 * 2/2009 Noonan, III ........... G06Q 10/00 709/225
2012/0208501 A1 * 8/2012 Tsuda ........ H04M 1/72403 455/411
2012/0215998 A1 * 8/2012 Sharp ........ G06F 3/065 711/E12.103
2013/0047203 A1 * 2/2013 Radhakrishnan ..... G06F 21/577 726/1
2013/0247519 A1 * 9/2013 Clark ........ B65B 59/02 53/452
2013/0330020 A1 * 12/2013 Thakkar .............. G06F 16/2291 382/305
2014/0019798 A1 1/2014 Allison et al.
2014/0046997 A1 2/2014 Dain et al.
2014/0053149 A1 * 2/2014 Wu ........ G06F 8/63 717/176
2014/0082131 A1 * 3/2014 Jagtap ........ G06F 9/5027 709/217
2014/0282413 A1 * 9/2014 Grimme .............. G06F 11/3672 717/124
2015/0095904 A1 * 4/2015 Ahmadi-Ardakani ........ G06F 11/3698 717/177
2015/0379429 A1 * 12/2015 Lee ........ G09B 5/00 706/11
2015/0379430 A1 * 12/2015 Dirac ........ G06N 20/00 706/12
2015/0381769 A1 * 12/2015 Yeh ........ H04L 67/10 709/223
2016/0014073 A1 * 1/2016 Reddy ........ G06F 8/61 713/2
2016/0078361 A1 * 3/2016 Brueckner .............. H04L 67/10 706/12
2016/0269318 A1 * 9/2016 Su ........ H04L 47/785
2016/0330277 A1 * 11/2016 Jain ........ H04L 67/1095
2017/0063722 A1 * 3/2017 Cropper ........ G06F 16/285
2017/0090896 A1 * 3/2017 Lin ........ G06F 8/61
2017/0171021 A1 * 6/2017 Angaluri ........ G06F 8/63
2017/0171306 A1 * 6/2017 Lucas ........ G06F 8/61
2017/0244640 A1 * 8/2017 Lin ........ H04L 43/08
2017/0344910 A1 * 11/2017 Wu ........ G06N 20/00
2018/0032593 A1 * 2/2018 Ledbetter ............ G06F 11/1448
2018/0089189 A1 * 3/2018 Gakhar ............... G06F 16/2255
2018/0089592 A1 * 3/2018 Zeiler ........ G06N 20/00
2018/0152534 A1 * 5/2018 Kristiansson ........... H04L 67/56
2018/0176070 A1 * 6/2018 Shafiee ........ G06F 9/5083
2018/0219728 A1 * 8/2018 Beyh ........ H04L 41/40
2018/0219959 A1 * 8/2018 Bugenhagen ......... H04L 41/083
2018/0278680 A1 * 9/2018 Liu ........ H04L 67/563
2018/0349191 A1 * 12/2018 Dorsey ........ G06F 9/5044
2018/0357047 A1 * 12/2018 Brown ........ G06N 3/082
2019/0102206 A1 * 4/2019 Fichtenholtz ....... G06F 9/44505
2019/0155633 A1 * 5/2019 Faulhaber, Jr. .......... G06N 5/04
2019/0156244 A1 * 5/2019 Faulhaber, Jr. ....... G06F 9/5072
2019/0156247 A1 * 5/2019 Faulhaber, Jr. .......... G06N 3/08
2019/0279114 A1 * 9/2019 Deshpande ............ G06N 20/00
2019/0327259 A1 * 10/2019 DeFelice ........ G06N 3/044
2020/0019443 A1 * 1/2020 Schardt ........ G06F 9/5077
2020/0097204 A1 * 3/2020 Sato ........ G06F 11/203
2020/0167202 A1 * 5/2020 Huang ............... G05B 13/0265
2020/0272920 A1 * 8/2020 Liu ........ G06N 5/043
2020/0296173 A1 9/2020 Feiguine et al.
2020/0311617 A1 * 10/2020 Swan ........ G06F 9/5077
2020/0322263 A1 * 10/2020 Wu ........ H04L 47/828
2020/0349041 A1 11/2020 Roll et al.
2021/0011838 A1 * 1/2021 Kolan ........ G06F 11/263
2021/0019131 A1 * 1/2021 Tulsian ........ G06F 8/63
2021/0026703 A1 * 1/2021 Fichtenholtz ......... G06F 9/5027
2021/0055977 A1 * 2/2021 Lisuk ........ G06N 20/00
2021/0073736 A1 * 3/2021 Alawi ........ G06Q 10/105
2021/0081313 A1 * 3/2021 Jang ........ G06F 3/0608
2021/0144517 A1 * 5/2021 Guim Bernat ........ G06F 9/5072
2021/0150411 A1 * 5/2021 Coenders ............ G06F 21/6209
2021/0174238 A1 * 6/2021 Song ........ G06F 16/2465
2021/0319360 A1 * 10/2021 Vishnoi ........ G06N 3/006
2021/0342193 A1 * 11/2021 Anand ........ G06F 9/5077
2021/0405987 A1 * 12/2021 Bower, III ........ G06F 8/61
2022/0075610 A1 * 3/2022 Wang ........ G06F 8/63
2022/0083363 A1 * 3/2022 Lewis ........ H04L 67/34
2022/0083389 A1 * 3/2022 Poothia ........ G06F 9/5027
2022/0172100 A1 * 6/2022 Balasubramanian ........ G06T 7/0008
2022/0179661 A1 * 6/2022 Kim ........ G06F 9/445
2022/0222640 A1 * 7/2022 Mimassi .............. G06Q 20/202
2022/0237505 A1 * 7/2022 Feldman ............. G06F 9/45558
2022/0237506 A1 * 7/2022 Feldman ............. G06F 9/45558
2022/0246303 A1 * 8/2022 Sakaguchi .............. G06F 13/00
2022/0255731 A1 * 8/2022 Modica ........ H04L 9/085
2022/0261270 A1 * 8/2022 Gizis ........ H04L 63/0281
2022/0300754 A1 * 9/2022 Biswas ........ G06N 3/082
2022/0318647 A1 * 10/2022 Ashrafzadeh ............ G06N 5/04
2022/0382539 A1 * 12/2022 Gumashta .............. G06N 20/00
2022/0382601 A1 * 12/2022 Feldman ............... G06F 9/5083
2022/0383150 A1 * 12/2022 Le ........ G06N 20/00
2022/0391747 A1 * 12/2022 Ashrafzadeh .......... G06N 20/00
2022/0391748 A1 * 12/2022 Nikitin ........ H04L 67/51
2022/0391749 A1 * 12/2022 Feldman ........ G06F 8/60
2022/0414547 A1 * 12/2022 Ashrafzadeh ........... G06F 18/29
2022/0414548 A1 * 12/2022 Ashrafzadeh ........... G06F 18/25
2022/0417215 A1 * 12/2022 Parthasarathi ........ H04L 63/029
2023/0059339 A1 * 2/2023 Rangarajan ............... G06F 8/61
2023/0074530 A1 * 3/2023 Rigamonti .............. H04L 45/42
2023/0093963 A1 * 3/2023 Kumar ........ H04L 41/16 370/252
2023/0110057 A1 * 4/2023 Kan ........ G06F 16/258 707/723
2023/0111775 A1 * 4/2023 Lee ........ G06N 20/00 706/12
2023/0195671 A1 * 6/2023 Wang ........ H04L 67/1097 710/305
2023/0222783 A1 * 7/2023 Bowman ............... G06V 20/56 382/104
2023/0273837 A1 * 8/2023 Fong ........ G06F 9/5072 718/1

(56) References Cited

U.S. PATENT DOCUMENTS

| | | | | |
|---|---|---|---|---|
| 2023/0289193 | A1* | 9/2023 | Guntupalli | H04W 24/08 |
| 2023/0300686 | A1* | 9/2023 | Pantelidou | H04W 36/0033 370/331 |
| 2023/0306314 | A1* | 9/2023 | Chandrasekaran | G06N 20/20 |
| 2023/0325258 | A1* | 10/2023 | Wang | H04L 41/16 718/105 |
| 2023/0376167 | A1* | 11/2023 | Imam | G06F 3/04847 |
| 2023/0385692 | A1* | 11/2023 | Kang | G06N 20/00 |
| 2024/0022927 | A1* | 1/2024 | Tong | H04W 4/40 |
| 2024/0143807 | A1* | 5/2024 | Singh | G06F 21/6218 |
| 2025/0173183 | A1* | 5/2025 | Trikande | G06F 9/5027 |

OTHER PUBLICATIONS

Written Opinion dated Nov. 16, 2022 from the International Searching Authority in International Application No. PCT/US2022/037254.

* cited by examiner

SYSTEM AND METHOD FOR AUTOMATED CONFIGURATION OF NODES IN A SERVER CLUSTER

CROSS REFERENCE TO RELATED APPLICATIONS

This application is a National Stage of International Application No. PCT/US2022/037254 filed Jul. 15, 2022.

FIELD OF TECHNOLOGY

Apparatuses and methods consistent with example embodiments relate to installation and configuration of nodes in a server cluster, and more particularly, to automated configuration of a device intended for use as a node having a particular role in the server cluster.

BACKGROUND

A server cluster is a means of providing redundant operation, particularly in cloud computing. Several similar or identical computing devices are connected to serve as nodes in the cluster, with each node assigned a role. These roles include but are not limited to storage nodes, which store data, and "compute" or "worker" nodes, which operate cloud computing operations.

Worker nodes having the same role can operate interchangeably under the control of one or more "master" or "controller" nodes. A user who accesses the cluster for cloud computing operations can be assigned any available worker node, which will execute those operations on a "virtual machine" that provides consistent behavior for the user. A user is generally unaware which of the many worker nodes of a cluster is operating their virtual machine, which indeed is likely to vary between logins. Similarly, storage nodes can store data redundantly, and therefore a user, master node, or worker node can access any available storage node to retrieve desired data.

A server cluster therefore provides tremendous flexibility. If a particular node is unavailable due to, for example, insufficient free processing power, insufficient free bandwidth, malfunction, or maintenance, the user is simply connected with a different node, and is unlikely to notice the difference in ordinary operation.

SUMMARY

It is an object of the disclosed system and method to automatically configure a server or other computing device for a selected role in a server cluster.

It is another object of the disclosed system and method to automatically validate the computing device as proper for the selected role.

It is yet another object of the disclosed system and method to reduce configuration time and error in assembling a server cluster.

In accordance with certain embodiments of the present disclosure, a method is provided for automated configuration of a node in a server cluster. The method includes acquiring, by a processor, for a first computing device intended for deployment as a node of a selected role in the server cluster, a hardware description of the first computing device internally stored by the first computing device. The method further includes, based on validation of the hardware description of the first computing device, selectively configuring, by the processor, the first computing device. The device hardware description is validated according to hardware of a second computing device previously configured as a node of the selected role in the server cluster. The selective configuring of the first computing device includes selectively installing an operating system image to the first computing device. The operating system image is an image of an operating system installed to the second computing device. The method further includes registering, by the processor, the first computing device in the server cluster as a node having the selected role.

In accordance with certain other embodiments of the present disclosure, a non-transitory computer-readable recording medium is provided to have recorded thereon instructions executable by at least one processor to perform a method for automated configuration of a node in a server cluster. The method includes acquiring, for a first computing device intended for deployment as a node of a selected role in the server cluster, a hardware description of the first computing device internally stored by the first computing device. The method further includes, based on validation of the hardware description of the first computing device, selectively configuring the first computing device. The device hardware description is validated according to hardware of a second computing device previously configured as a node of the selected role in the server cluster. The selective configuring of the first computing device includes selectively installing an operating system image to the first computing device. The operating system image is an image of an operating system installed to the second computing device. The method further includes registering the first computing device in the server cluster as a node having the selected role.

In accordance with certain other embodiments of the present disclosure, a system is provided for automated configuration of a node in a server cluster. The system includes at least one communication module configured to transmit and receive a signal. The system further includes a non-transitory non-volatile memory electrically configured to store instructions. The system further includes at least one processor operatively connected to the at least one communication module and the non-volatile memory. The at least one processor is configured to execute the instructions to acquire via the communication module, for a first computing device intended for deployment as a node of a selected role in the server cluster, a hardware description of the first computing device internally stored by the first computing device. The at least one processor is further configured to execute the instructions to, based on validation of the hardware description of the first computing device, selectively configure the first computing device. The device hardware description is validated according to hardware of a second computing device previously configured as a node of the selected role in the server cluster. The selective configuring of the first computing device includes selectively installing an operating system image to the first computing device. The operating system image is an image of an operating system installed to the second computing device. The at least one processor is further configured to execute the instructions to register the first computing device in the server cluster as a node having the selected role.

Additional aspects, details, and advantages of the disclosed system and method will be set forth, in part, in the description and figures which follow.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
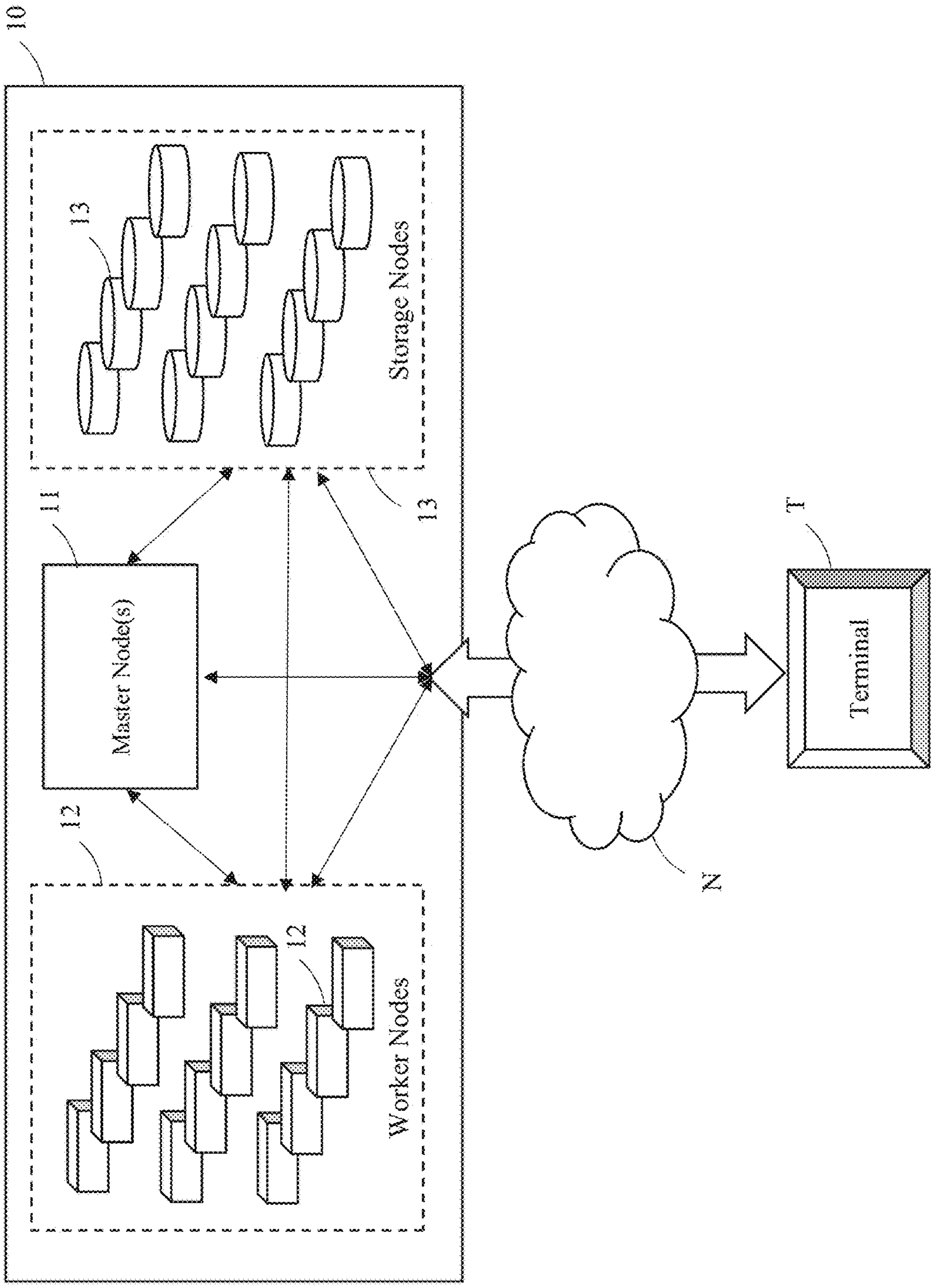
FIG. 1 is a depiction of an illustrative example of a server cluster, in accordance with an exemplary embodiment of the present invention.

Reference will now be made in detail to exemplary embodiments, which are illustrated in the accompanying drawings, wherein like reference numerals refer to the like elements throughout. The embodiments are described below in order to explain the disclosed system and method with reference to the figures illustratively shown in the drawings for certain exemplary embodiments for sample applications.

As noted in the Background, a server cluster provides flexible operation through a plurality of redundant server nodes. The components and general principles of server clusters are largely known in the art, and for reasons of brevity will not be detailed here. However, for context, a simple exemplary server cluster will be briefly described with reference to FIG. 1.

According to the example illustrated in FIG. 1, a server cluster 100 includes a set of master nodes 110, a set of worker nodes 120, and a set of storage nodes 130. Each node is a physical computing device which includes a processor and an interface for connecting with other computing devices. The nodes in each set 110, 120, 130 are communicatively coupled to the other nodes of the system, and to a network N, through any suitable combination of buses, switches/hubs, and/or other connective systems known in the art.

The master node set 110 can be a single master node, but is preferably a plurality of master nodes. More specifically, the master node set 110 is preferably at least three master nodes operating for redundancy. An active master node manages the operations of the master node set 110, with the other master nodes synching to the active master node in terms of tracked operations and other data. If the active master node becomes unavailable, the remaining master nodes compare their data, and the master node with the most recent sync which is determined to be accurate will become the new active master node.

The worker node set 120 is a plurality of worker nodes. Each worker node is preferably of substantially identical hardware, and configured in a substantially identical manner, as the others in the set. In this manner, each worker node can provide substantially identical behavior regardless of which worker node is assigned to a user.

The storage node set 130 is a plurality of storage nodes. Each storage node is preferably of substantially identical hardware, and configured in a substantially identical manner, as the others in the set. In this manner, each storage node can provide substantially identical behavior regardless of which storage node is assigned to a user or worker node.

It is noted that server clusters are not limited to the above three types of nodes, but may also have other varieties of nodes each having their own "role" or set of functions.

The network N can in various implementations be the Internet, or a smaller network such as an internal office network.

A terminal device T or other client device connects to the cluster 100 through the network N. The master node set 110 receives an initial connection request, and depending on the nature of the request, assigns a worker node 120*t* from the worker node set 120, a storage node 130*t* from the storage node set 130, or both. The terminal T then directly interacts with the assigned worker node and/or storage node going forward.

In particular, if a worker node 120*t* is assigned to execute a virtual machine, the worker node 120*t* loads the virtual machine, retrieving user configuration data for that virtual machine as needed from the assigned storage node 130*t* and/or the master node set 110, to provide a consistent behavior for the user of the terminal T.

To prepare a server cluster 100, individual nodes must be connected and configured to operate according to their assigned role. An operating system (OS) and various cloud-enabling software systems must be installed, and their settings configured to reflect both the needs of the cluster and the particular hardware components of the node. Settings can include but are by no means limited to: storage format, network and other communication protocols, clock synchronization protocols, and interface assignment.

Server clusters which will be used for Internet cloud computing can grow to massive size, requiring a number of nodes on the order of thousands. In a conventional process, the configuration of such a large number of nodes can be a lengthy and tedious affair, requiring hundreds of man-hours, and also resulting in a high probability of installation error for a non-trivial number of nodes, which might remain unnoticed until the node behaves unexpectedly during normal operation.

Briefly, a method realized in accordance with certain aspects of the present invention provide for semi-automated "plug-and-play" configuration of nodes being added to a server cluster. The method exploits various programmed operations and connectivity features which come conventionally pre-implemented as one or more small utilities on the majority of computing devices, to confirm a new node's suitability for its role in the cluster and for the use of the method as a whole.

The method additionally exploits that is strongly preferred that a server cluster have substantially identical hardware in each node of a given role (e.g. worker nodes, storage nodes), so that behavior is consistent regardless of the particular node operating at the moment. Indeed, differences in hardware architecture can cause full operational failure of virtual machines or application containers, or a disruptive migration of such machines and containers, as they may expect particular hardware components or architectures that are not present in all nodes of a particular role.

This preference, if made a rule that all servers of a particular role must be the same model, enables aspects of the present invention. Additionally, several preliminary operations which rely on a particular model will at most fail harmlessly when a different model is used, which serves as a signal to investigate whether the rule has inadvertently not been followed. Through these inherent checks and more direct confirmation that the model is correct, later configuration operations can operate without undue risk of a more harmful failure.

It is here noted that this rule need not apply to all roles in a cluster for the purpose of the invention, merely those roles for which certain disclosed aspects of the invention below will be applied.

For convenience, going forward it will be assumed that the node to be configured is a worker node. However, those of ordinary skill will be able to apply the same principles to the configuration of a storage node or other type of node.

A general flow of processes for automated configuration of a node (e.g. a worker node) for a server cluster, in accordance with an exemplary embodiment of the present invention, will now be described with reference to FIGS. 2A and 2B.

A computing device has been selected for use as a node of a selected role, for example a worker node, in the server cluster. While the computing device can be any kind of machine which has the physical capability to process and transmit data—including but not limited to “rack” and “blade” servers, desktop and laptop computers, smartphones and tablets, and modern gaming consoles—for convenience and brevity, a rack-mountable server will be assumed hereinafter.

The new server is produced by a particular vendor or manufacturer, and includes a particular set of hardware components, such as a motherboard, a processor, memory (of various kinds), and a network card, arranged in a particular architecture.

Figure 2A:
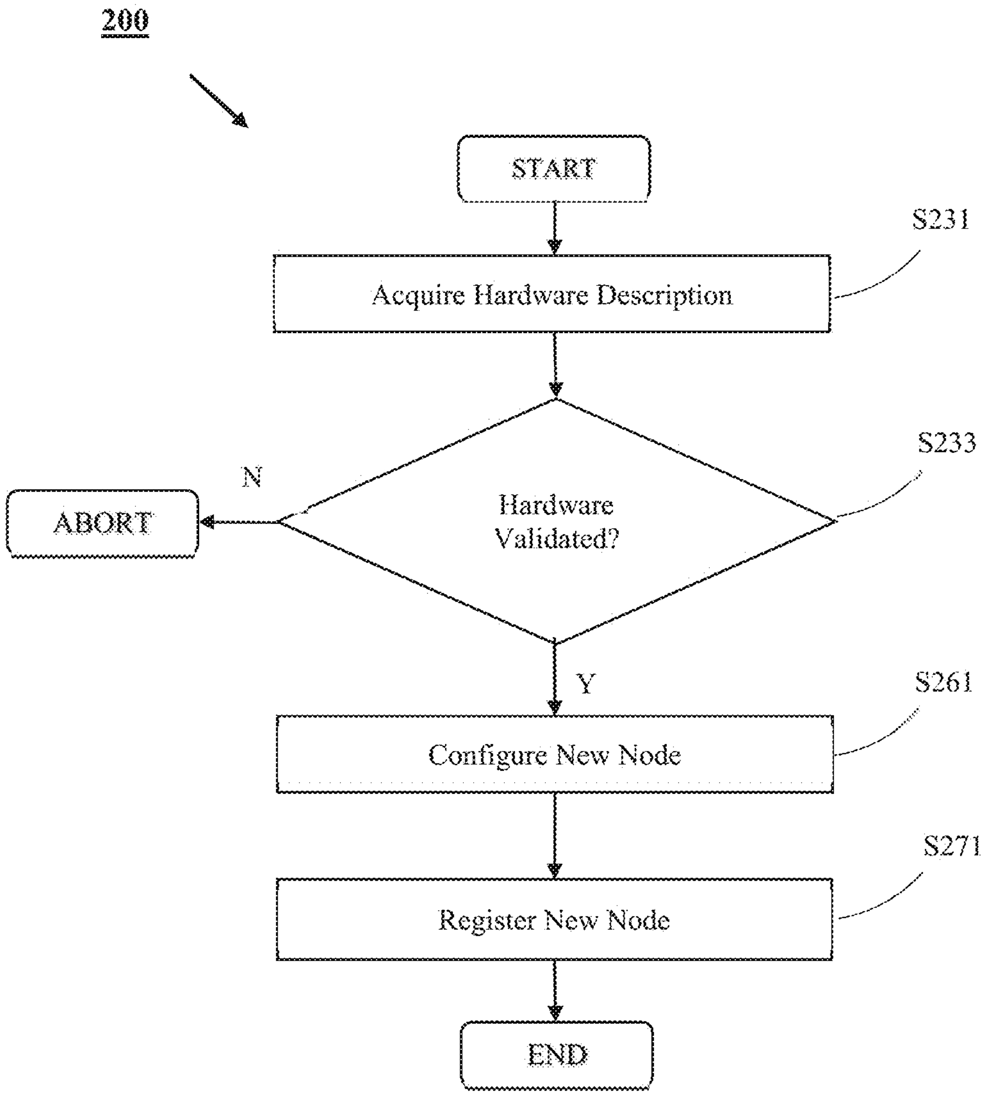
FIG. 2A is a flow diagram illustrating a flow of processes for automated configuration of a node in a server cluster, in accordance with an exemplary embodiment of the present invention.

As depicted in FIG. 2A, a method for automated configuration of a node in a server cluster includes acquiring a hardware description of the server which will be deployed as the node, at S231. The hardware description is acquired by a processor, which retrieves this information from data internally stored by the server. Possible details of this operation, in certain embodiments, will be elaborated on herein with respect to later figures.

The method also includes validating the hardware description as approved for the selected role (e.g. worker node) of the server, at S233. This validation is performed by a processor, which compares the hardware configuration of the server to that of a second computing device which has already been configured for the same selected role. Possible details of this operation, in certain embodiments, will be elaborated on herein with respect to later figures.

The method also includes selectively configuring the server, at S261. This configuration is performed by a processor, which installs an operating system image to the server which has been acquired from the prior computing device. The configuration and installation are performed selectively, based on whether the validation was successful at S233; if the validation was unsuccessful, the process aborts early. Possible details of this operation, in certain embodiments, will be elaborated on herein with respect to later figures.

The method also includes registering the server to the server cluster, at S271. The server is registered by a processor, which registers the server as a node having the selected role. Possible details of this operation, in certain embodiments, will be elaborated on herein with respect to later figures. The process then ends.

Figure 2B:
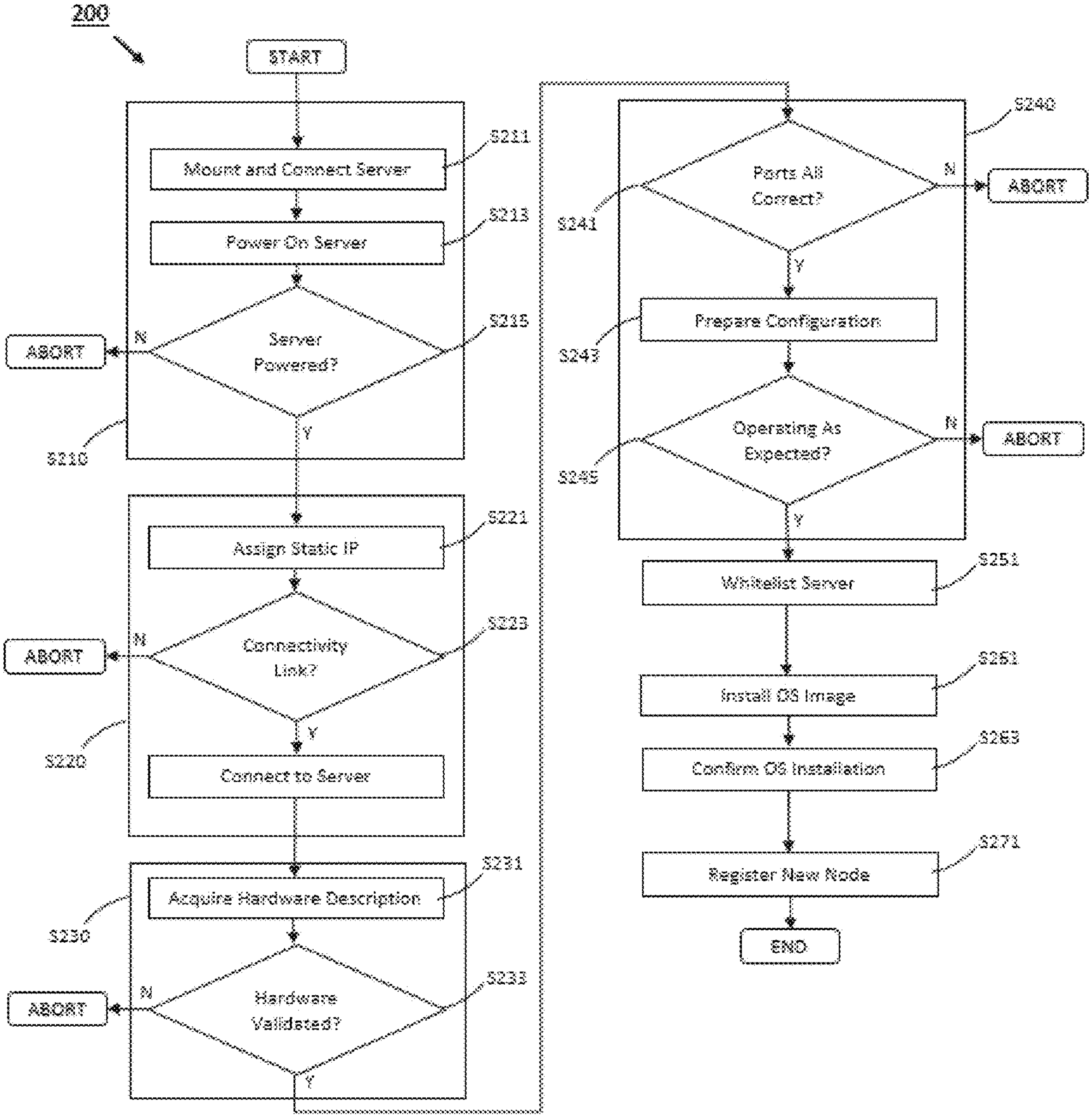
FIG. 2B is a flow diagram illustrating an expanded flow of processes for automated configuration of a node in a server cluster, in accordance with an exemplary embodiment of the present invention.

FIG. 2B depicts an illustrative expansion on the example method 200 of FIG. 2A.

This expanded method assumes that at least one node of the same role has already been configured for the server cluster in a conventional manner. As such processes are known in the art, they will not be detailed herein. However, during or at the conclusion of this conventional configuration, an image or copy of the operating system as fully configured for the node is stored for later reference in a data repository or other non-transitory data storage medium. Other data describing this previously-configured node is also preferably stored, and will be described further below.

At several points in the illustrated method, the process may abort due to a test failure. Such test failures indicate that the server needs to be investigated and possibly diagnosed or replaced. Once the issue causing the test failure is resolved, the method can be started over with the same or a different server, as appropriate.

As depicted in FIG. 2B, an physical installation of the new server occurs at S210. Specifically, at S211, the new server is mounted on a server rack, and cables are connected to couple the server to the rest of the cluster and the network, and to supply power. At S213, the server is powered on, and it is tested at S215 whether the hardware is powering on properly. If not, the process aborts and the server is investigated for issues, which may range from faulty hardware to an improper power coupling.

If the hardware powers on correctly, then at S220, a data connection is established between the new server and a configuration device. The configuration device may be one of the master nodes, or a separate computing device which configures new nodes for the server cluster.

Specifically, at S221, a static Internet Protocol (IP) address is assigned to an interface port of the new server. Preferably, the port is a Baseboard Management Controller (BMC) port of the new server. The assignment can be done manually or by a simple automated process.

At S223, the interface port is tested to confirm that connectivity is possible, for example by checking whether a corresponding network switch indicates that the port is linked thereto, and/or that a media access control (MAC) address of the interface port is readable at the IP address. If not, the process aborts and the server is investigated for issues, which may range from faulty hardware to an improper data connection. If the port is properly operating, however, the configuration device connects through the interface port, preferably by Secure Shell (SSH) Protocol, at S225. The SSH connection can assume that the default username and password for the model are in place, as no software has been yet installed and no internal configuration has yet been performed on the new server.

The hardware components and architecture of the server are then evaluated at S230.

It is noted that the new server preferably has no standard operating system (OS) installed at this stage. However, typically, a computer manufacturer will provide an in-built command line interface (CLI) tool which operates independently of any standard OS, and which can be operated prior to installation of an OS. Different manufacturers use different CLIs which respond to different commands, so it is necessary to know the manufacturer of a given computing device before using the CLI. The manufacturer can be determined from different sources such as a MAC address or a utility login prompt. Additionally, because the model and, by extension, manufacturer is assumed the same for all nodes in a given role, the CLI for a server is also known from the intended role of the server.

From this knowledge, a hardware description can be acquired at S231, preferably by an appropriate CLI command. Preferably, this description is a Field Replaceable Unit (FRU) inventory. Typically, a computer manufacturer will store an FRU inventory in non-volatile storage on the computing device, for retrieval by CLI command, as well as by an OS once installed on the device, or by other means. This FRU inventory describes the set of hardware components of the device. Alternatively, if a means for identifying the model itself is available, this can also serve as a hardware description.

At S233, the acquired FRU or other hardware description is validated as approved for the selected role (e.g. worker node) of the server. This is preferably by comparison to a description of the hardware of the previously-configured node, which preferably also includes FRU information. Alternatively, the hardware description can be checked against a reference list to identify the model of the new server, and it can be determined whether this is the same server model as the previously-configured node. Either hardware description of the previously-configured node can be stored in association with the role, in the same memory that stores the operating system image copied from the previously-configured node, or in another memory.

In either case, if the acquired hardware description does not match to the expected, role-approved hardware description at S233, the server is rejected under the rule that the models for a given role should have substantially identical hardware. The process therefore aborts so that another server can be substituted.

Additionally, if the hardware description is not acquired at all, the two most likely reasons are: the server is not properly connected, and therefore is not receiving or transmitting data cleanly, or the server is not made by the expected manufacturer, and therefore does not have the expected CLI or other initial configuration settings to provide the hardware description. In either case, trouble-shooting involves a physical examination of the server; the process therefore also aborts in this instance. The process can be resumed from the beginning if the issue was connectivity. If the issue was an incorrect manufacturer, then the general rule that all servers for a particular role have the same model has not been followed, and the server should be rejected and replaced with another server which will be configured in its place.

If the acquired hardware description matches the role-approved hardware description at S233, then the process can continue.

At S261, the operating system image from the previously-configured node is installed to the new server. This installation can be performed by various image deployment systems known in the art. As noted, the operating system image includes configuration data of the previously-configured node, which assumes the new server to have the appropriate hardware components. Said hardware has been confirmed present at S233, and indirectly in other operations, and the OS can therefore be expected to operate correctly on the new server. The operating system image can in this way serve as a master image which is installable to rapidly configure a server.

The new server is therefore now properly configured as a node of the selected role. Once the installation is confirmed complete at S263, then at S271, the master node registers the new server as one of the nodes of the cluster having the selected role, incrementing any count of the total nodes and assigning identifiers as needed. The method therefore completes successfully.

Preferably, before the OS is installed, additional validation testing is applied to the new server at S240. For example, preferably, at S241, the data connections are more thoroughly tested. Now that the hardware description is confirmed to be as expected at S233, the entire inventory of networking hardware and functionality is known. In many server configurations, multiple interface ports (each with different MAC addresses) will be provided for communication to the master node, to the other worker nodes, and to the network. Additionally, such ports will typically have in-built means of signaling whether a connection is established, although testing at the switch, as could be done at S223, is also an option. If any of the connections is determined to be failing, the method aborts before S261 so that the hardware can be diagnosed.

Also, preferably, at S243, the configuration for the server is prepared and tested. More specifically, preferably, a test operating application is installed to the new server. This is a reduced version of the OS with the same "worker node" configuration settings as present in the full image which will be installed at S261. Because the OS is reduced, it can be installed in a short time frame, on the order of five to ten minutes in comparison to hours to install the full-scale OS, but is still effective for final testing. The test operating application then executes in a reduced operating environment, such as a Preboot Execution Environment (PXE), at S245. If the test operating application does not operate as expected, the method aborts before S261 so that the hardware can be diagnosed.

If all validation testing passes, it can be said with relative certainty that the new server is proper for the assigned role. Therefore, preferably, at S251, the new server is "whitelisted": it is flagged in the configuration device and/or the master node as approved for installation of the appropriate operating system image. Such whitelisting permits the initial deployment of the operating system image to the server. More importantly, in a scenario where the server needs to be disconnected from the cluster temporarily, for maintenance or other reasons, the above method can be bypassed in reconnecting the server to the cluster, and the operating system image can be reinstalled as necessary without testing.

These and related processes, and other necessary instructions, are preferably encoded as executable instructions on one or more non-transitory computer readable media, such as hard disc drives or optical discs, and executed using one or more computer processors, in concert with an operating system or other suitable measures. More specifically, and as previously noted, the method described above can be programmed as executable software instructions to be stored and executed on one or more of the master nodes of the cluster, or alternatively on a separate computing device for managing node configuration.

In a software implementation, the software includes a plurality of computer executable instructions, to be implemented on a computer system. Prior to loading in a computer system, the software preferably resides as encoded information on a suitable non-transitory computer-readable tangible medium, such as magnetically, optically, or other suitably encoded or recorded media. Specific media can include but are not limited to magnetic floppy disks, magnetic tapes, CD-ROMs, DVD-ROMs, solid-state disks, or flash memory devices, and in certain embodiments take the form of pre-existing data storage (such as "cloud storage") accessible through an operably coupled network means (such as the Internet).

In certain implementations, the invention includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 3:
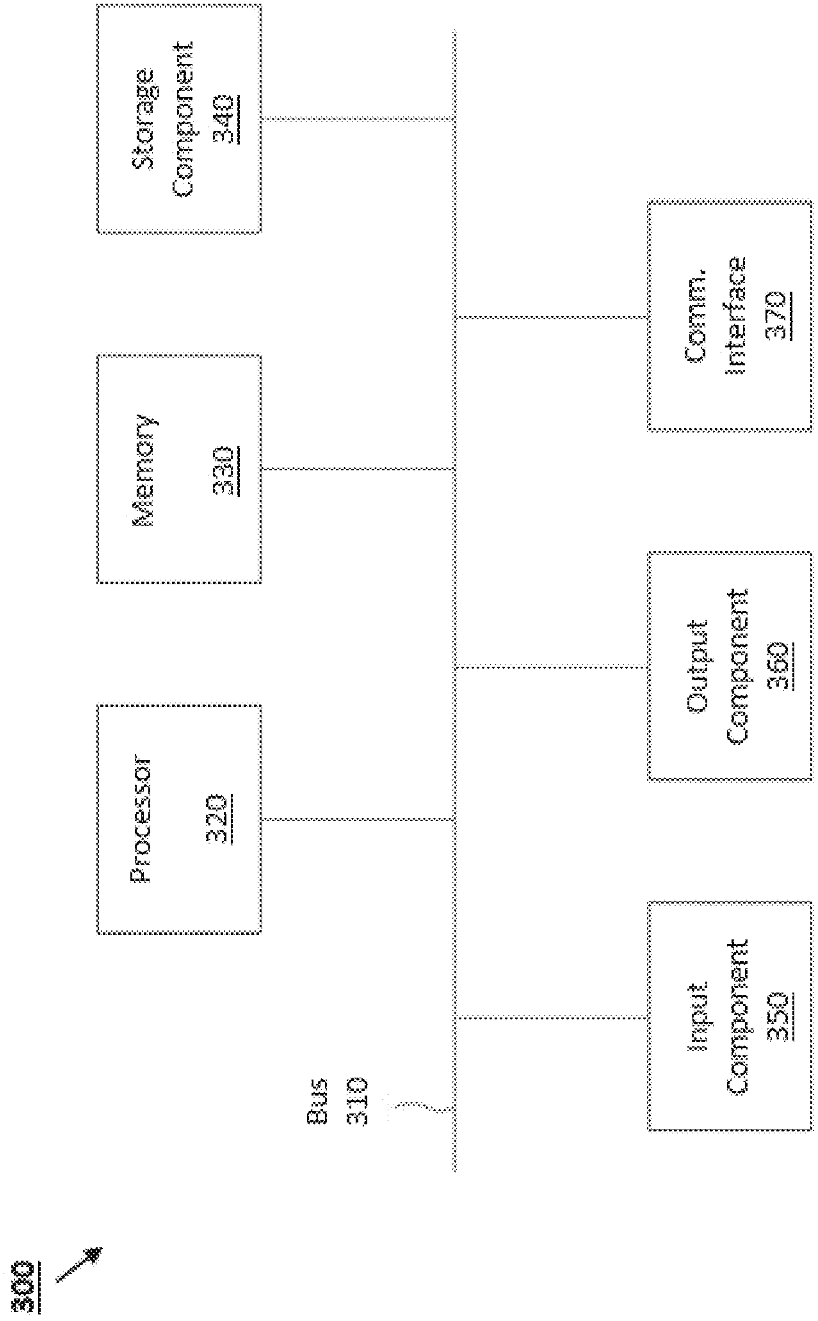
FIG. 3 is a diagram of components of one or more devices, in accordance with an exemplary embodiment of the present invention.

FIG. 3 is a diagram of components of one or more devices according to an embodiment. Device 300 may correspond to any computing device described above (such as any node in the set of master nodes 110, the set of worker nodes 120, or the set of storage nodes 130; and also any terminal T or configuration device), as well as to a processor executing any described software module or method, and to a memory containing any described data storage.

As shown in FIG. 3, the device 300 may include a bus 310, a processor 320, a memory 330, a storage component 340, an input component 350, an output component 360, and a communication interface 370. It is understood that one or more of the components may be omitted and/or one or more additional components may be included.

The bus 310 includes a component that permits communication among the components of the device 300. The processor 320 is implemented in hardware, firmware, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 320 includes one or more processors capable of being programmed to perform a function.

The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). The input component 350 may include a sensor for sensing information (e.g., a global positioning system (GPS) component, an accelerometer, a gyroscope, and/or an actuator).

The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform operations based on the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or storage component 340 may cause the processor 320 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for automated configuration of a node in a server cluster, the method comprising:

acquiring, by a processor, for a first computing device intended for deployment as a node of a selected role in the server cluster, a hardware description of the first computing device internally stored by the first computing device;

based on validation of the hardware description of the first computing device, selectively configuring, by the processor, the first computing device, the device hardware description being validated for use as the node of the selected role by determining a model of the first computing device based on the hardware description and comparing to a model of a second computing device previously configured as a node of the selected role in the server cluster to determine whether the first computing device has a same model as the second computing device, the selective configuring of the first computing device including selectively installing an operating system image to the first computing device, the operating system image being an image of an operating system installed to the second computing device and copied from the second computing device; and registering, by the processor, the first computing device in the server cluster as a node having the selected role, wherein the selective configuring of the first computing device is further based on results of a validation testing of a functionality of the first computing device, the validation testing, prior to installing the operating system image, comprising:

installing a test operating application on the first computing device, the test operating application being a reduced version of the operating system image copied from the second computing device; and testing data connectivity of first computing device and, separately, testing an operation of the test operating application in a reduced operating environment.

2. The method of claim 1, wherein the hardware description is a Field Replaceable Unit (FRU) inventory.

3. The method of claim 1, wherein the hardware description is acquired by operating an in-built command line interface of the first computing device.

4. The method of claim 1, further comprising establishing a data connection with the first computing device, wherein the hardware description is acquired through the data connection.

5. The method of claim 4, wherein the data connection is an out-of-band communication connection through a Baseboard Management Controller port.

6. The method of claim 4, wherein the data connection is established by Secure Shell Protocol.

7. The method of claim 1, wherein the registering of the first computing device includes flagging the first computing device as approved for re-installation of the role-approved operating system image.

8. The method of claim 1, wherein the selected role is one of a worker node and a storage node.

9. A non-transitory computer-readable recording medium having recorded thereon instructions executable by at least one processor to perform a method for automated configuration of a node in a server cluster, the method comprising:

acquiring, for a first computing device intended for deployment as a node of a selected role in the server cluster, a hardware description of the first computing device internally stored by the first computing device;

based on validation of the hardware description of the first computing device, selectively configuring the first computing device, the device hardware description being validated for use as the node of the selected role by determining a model of the first computing device based on the hardware description and comparing to description model of a second computing device previously configured as a node of the selected role in the server cluster to determine whether the first computing device has a same model as the second computing device, the selective configuring of the first computing device including selectively installing an operating system image to the first computing device, the operating system image being an image of an operating system installed to the second computing device and copied from the second computing device; and registering the first computing device in the server cluster as a node having the selected role, wherein the selective configuring of the first computing device is further based on results of a validation testing of a functionality of the first computing device, the validation testing, prior to installing the operating system image, comprising:

installing a test operating application on the first computing device, the test operating application being a reduced version of the operating system image copied from the second computing device; and testing data connectivity of first computing device and, separately, testing an operation of the test operating application in a reduced operating environment.

10. A system for automated configuration of a node in a server cluster, the system comprising:

a non-transitory non-volatile memory electrically configured to store instructions; and at least one processor operatively connected to the non-volatile memory, the at least one processor being configured to execute the instructions to:

acquire, for a first computing device intended for deployment as a node of a selected role in the server cluster, a hardware description of the first computing device internally stored by the first computing device;

based on validation of the hardware description of the first computing device, selectively configure the first computing device, the device hardware description being validated for use as the node of the selected role by determining a model of the first computing device based on the hardware description and comparing to a model of a second computing device previously configured as a node of the selected role in the server cluster to determine whether the first computing device has a same model as the second computing device, the selective configuring of the first computing device including selectively installing an operating system image to the first computing device, the operating system image being an image of an operating system installed to the second computing device and copied from the second computing device; and register the first computing device in the server cluster as a node having the selected role, wherein the at least one processor selectively configures the first computing device further based on results of a validation testing of a functionality of the first computing device, the validation testing, prior to installing the operating system image, including:

installing a test operating application on the first computing device, the test operating application being a reduced version of the operating system image copied from the second computing device, and testing data connectivity of first computing device and, separately, testing an operation of the test operating application in a reduced operating environment.

11. The system of claim 10, wherein the hardware description is a Field Replaceable Unit (FRU) inventory.

12. The system of claim 10, wherein the at least one processor acquires the hardware description by operating an in-built command line interface of the first computing device.

13. The system of claim 10, wherein the at least one processor is further configured to execute the instructions to establish a data connection with the first computing device, and the hardware description is acquired through the data connection.

14. The system of claim 13, wherein the data connection is an out-of-band communication connection through a Baseboard Management Controller port.

15. The system of claim 13, wherein the at least one processor establishes the data connection by Secure Shell Protocol.

16. The system of claim 10, wherein the at least one processor registers the first computing device by flagging the first computing device as approved for re-installation of the role-approved operating system image.

17. The system of claim 10, wherein the selected role is one of a worker node and a storage node.

* * * * *